United States Patent [19]
Mages et al.

[11] Patent Number: 6,035,329
[45] Date of Patent: Mar. 7, 2000

[54] METHOD OF SECURING THE PLAYBACK OF A DVD-ROM VIA TRIGGERING DATA SENT VIA A CABLE NETWORK

[75] Inventors: Kenneth G. Mages, Highland Park; Jie Feng, Wilmette; Kent Mages, Highland Park, all of Ill.

[73] Assignee: HyperLOCK Technologies, Inc., Skokie, Ill.

[21] Appl. No.: 09/027,113

[22] Filed: Feb. 18, 1998

Related U.S. Application Data

[63] Continuation-in-part of application No. 08/911,796, Aug. 15, 1997, which is a continuation-in-part of application No. 08/568,631, Dec. 7, 1995, abandoned, and a continuation-in-part of application No. 08/756,162, Nov. 25, 1996, Pat. No. 5,892,825.

[51] Int. Cl.[7] ................................................... G06F 13/00
[52] U.S. Cl. ............................................................ 709/217
[58] Field of Search ........................ 364/DIG. 1 MS File, 364/DIG. 2 MS File, 478.01, 479.07; 455/409; 380/5, 20; 709/200, 217

[56] References Cited

U.S. PATENT DOCUMENTS 5,809,245  9/1998  Zenda ...................................... 709/217
5,933,500  8/1999  Blatter et al. .............................. 380/20

*Primary Examiner*—Robert B. Harrell
*Attorney, Agent, or Firm*—Hamman & Benn

[57] ABSTRACT

A method and system for implementing the pay-per-view DVD-ROM system, whereby the enabling data provided to the DVD-player allowing the playback of the DVD-ROM video data is provided to the DVD-player via the Internet or via the cable-TV system provider. The invention discriminates between DVD-ROM's requiring pay-per-view play, and those that are free and do not require pay-per-view play, by the use of a special code for the header of the DVD-ROM indicating a pay-per-view title. Also disclosed is use of a smart card or ATM card for receiving the enabling data for allowing playback of the Hyper-DVD disk.

16 Claims, 4 Drawing Sheets

Microfiche Appendix Included
(1 Microfiche, 27 Pages)

METHOD OF SECURING THE PLAYBACK OF A DVD-ROM VIA TRIGGERING DATA SENT VIA A CABLE NETWORK

CROSS REFERENCE TO RELATED APPLICATION

The present application is a continuation-in-part of application Ser. No. 08/911,796, filed Aug. 15, 1997, which is a continuation-in-part of application Ser. No. 08/568,631, filed on Dec. 7, 1995, now abandoned, and a continuation-in-part of application Ser. No. 08/756,162, filed on Nov. 25, 1996, now U.S. Pat. No. 5,892,825.

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

REFERENCE TO MICROFICHE APPENDIX

Reference is had to the accompanying microfiche appendix consisting of one sheet of microfiche having 27 frames.

BACKGROUND OF THE INVENTION

In Applicants' copending applications listed above, which are incorporated by reference herein, there is a disclosed a method of securing a CD-ROM by crippling the video and audio data thereon, and allowing the playback of the data thereon only by means of enabling data sent via the Internet, which enabling data uncripples the crippled data on the CD-ROM.

While CD-ROMs provide a great amount of data storage, a new disc called DVD-ROM (digital video disk) provides considerably more data storage, reaching data storage capacities of up to 17 GB as compared to 680 MGB for a CD-ROM. This DVD-disc has especial usefulness in the storage of archiving data and in the storage of video data, such as full-length movies. Conventional CD-ROMS do not provide enough storage capacity for full-length movies, and the like. In conjunction with the DVD-ROM disc, is a new envisioned technology called "Zoom-TV", which will prevent the playback of the DVD-ROM without first obtaining permission form a service-provider. This service-provider will send the necessary enabling data to the system playing the DVD-ROM for allowing the data on the DVD-ROM to be played back, for which the user of the DVD-ROM will be billed, whereby a pay-per-view type of system is effected. The user's system for playing the DVD-ROM will call the service-provider via the land-line telephone network, over which the necessary enabling data for playing the DVD-ROM is also transmitted to the user's or requesting system. The pay-per-view DVD system will typically include a DVD-player, which includes a video player such as MPEG-2, a TV or monitor, and a microprocessor or personal computer. The user will request permission to playback the video on the DVD-ROM by calling up the service provider via the public, switched telephone network, or PSTN.

DVD-ROMs containing full-length movies presently are provided with parental rating controls, which a three-tier format: To wit, a "Kids' Title" playback only, a "Forbid Adult Titles" mode, and a "Play All Titles" mode. Each title of a DVD-ROM is accorded one of a first, general category allowing playback by any of the three modes, a second "Kids" category for playback only in the "Kids' Title" playback mode and which prevents all other titles including adult titles, and a third "Forbid-Adult" category for which only adult titles are prevented from being played but all other titles may be played. For purposes of this application, the first general category, allowing complete playback of all titles, is assigned the equivalent code of "1" in its heading, while the second Kids' titles only playback mode is assigned a code of "2", and the third "Forbid-Adult" category for which only adult titles are prevented from being played having a code of "3" in its header. The DVD player, such as MPEG-2, has corresponding software for detecting the category codes, and software for setting the level of playback, whether it be the first, second or third mode.

In addition to parental control codes, each DVD-ROM also has a country code, with the code representing the country of manufacture of the DVD-ROM. In conjunction with this, each DVD-player has a country code, with the DVD-player's software preventing play of the DVD-ROM if the country code on the DVD-ROM does not match the country code of the DVD-player. This system is intended to prevent the illegal copying and pirating of the videos on the DVD-ROM.

Cable-TV networks are well-known. These systems utilize a set-top box converter for receiving the signals from the cable-TV provider and playing them back on the TV or monitor. Cable-TV networks also now have units that allow access to the Internet via the cable network, with such units having their own microprocessor for allowing communication with the Internet and for the display of Internet data on the TV or monitor.

SUMMARY OF THE INVENTION

It is the primary objective of the present invention to provide a method and system for implementing the pay-per-view DVD-ROM system, whereby the enabling data provided to the DVD-player allowing the playback of the DVD-ROM (Hyper-DVD) video data is provided to the DVD-player via the Internet or via the cable-TV system provider.

It is also the primary objective of the present invention to provide a method and system for playing back DVD-ROMs which system discriminates between DVD-ROM's requiring pay-per-view play, and those that are free and do not require pay-per-view play.

It is also the primary objective of the present invention to provide a method and system for playing back DVD-ROMs which system discriminates between DVD-ROM's requiring pay-per-view play, and those that do not, by the use of a special code for the header of the DVD-ROM indicating a pay-per-view title.

It is also the primary objective of the present invention to provide a method and system for playing back DVD-ROMs which system discriminates between DVD-ROM's requiring pay-per-view play, and those that do not, by the use of an ATM card.

It is, also, a primary objective to use a smart card or ATM card for receiving the enabling data for allowing playback of the Hyper-DVD disk.

BRIEF DESCRIPTION OF THE DRAWINGS

The invention will be more readily understood with reference to the accompanying drawing, wherein:

FIG. 6 is a schematic showing the flow of data between an ATM-card and the Internet server.

DETAILED DESCRIPTION OF THE INVENTION

Figure 1:
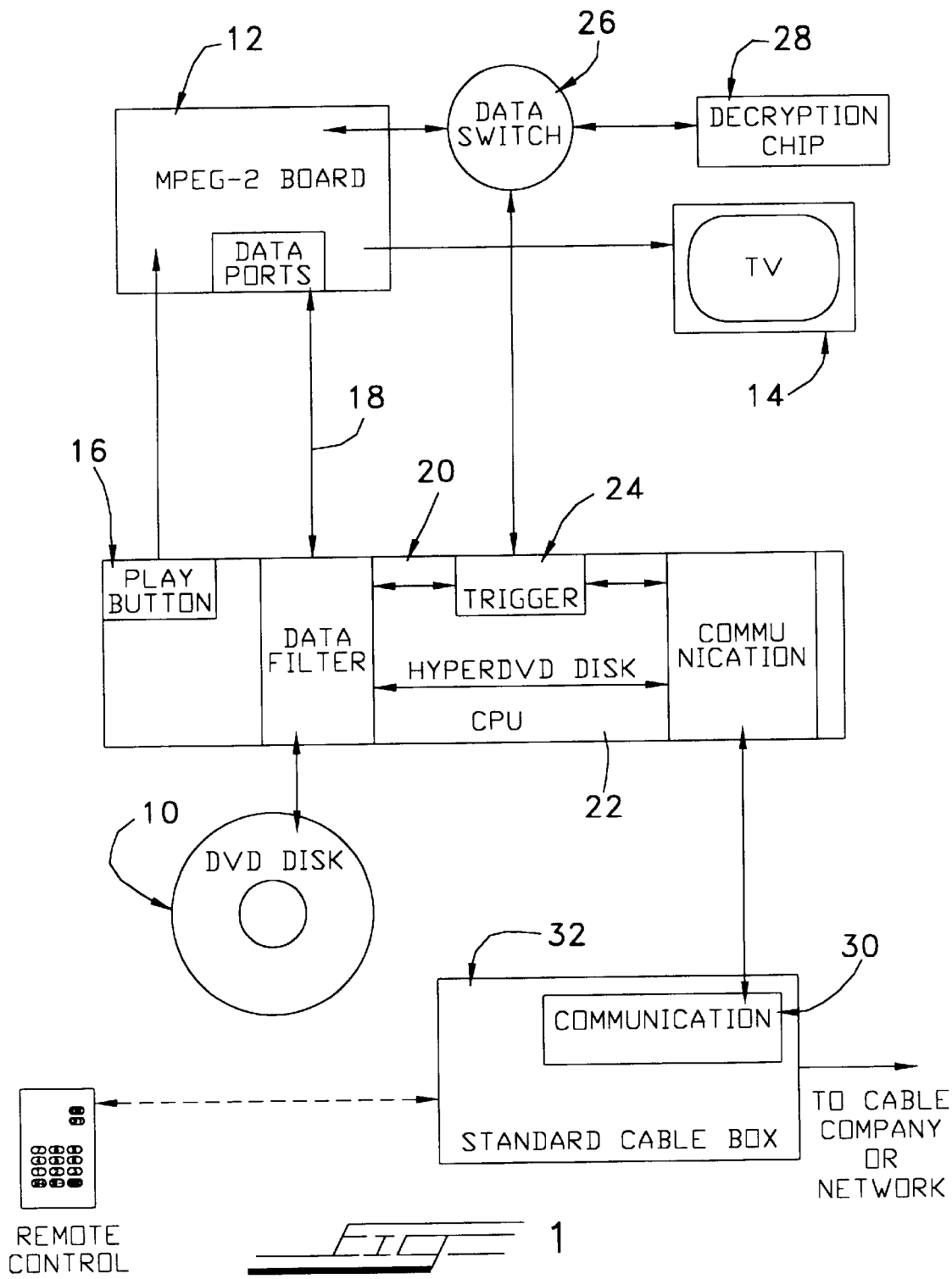
FIG. 1 is a block diagram of the DVD-ROM player system of the invention allowing both pay-per-view DVD-ROM play and conventional, non-pay-per-view DVD-ROM play.
Figure 2:
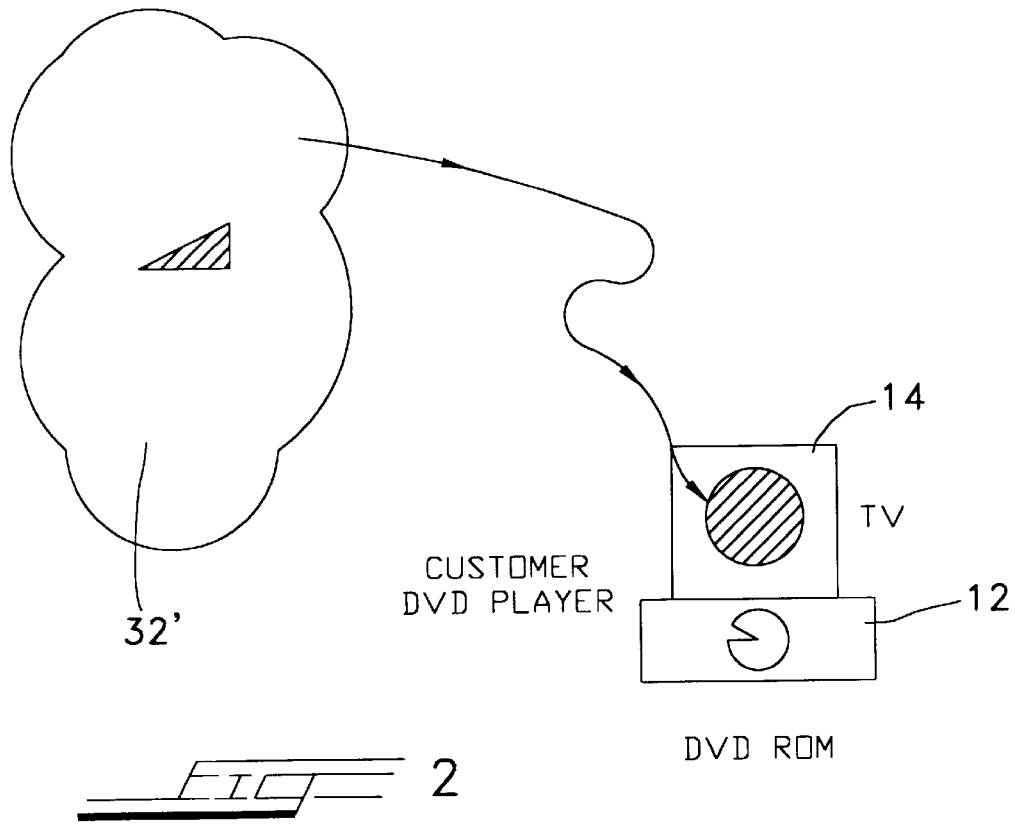
FIG. 2 is a schematic showing the connection between the Internet Service Provider and a customer's DVD-player.

Referring now to the drawing in greater detail, and to FIGS. 1 and 2 for now, a DVD-ROM disk 10 contains a full-length movie, play, special event, and the like. For playing the DVD-ROM, there is provided a DVD-ROM player 12, such as MPEG-2 for playing the video on a TV or monitor 14. Associated with the player is a microprocessor or CPU 22, such as that forming part of a PC, or a dedicated microprocessor. The microprocessor 16 conventionally communicates with the DVD-player 12 via data ports 18. Associated with the microprocessor is memory storage 20 for storing software that allows the system of the invention to discriminate between DVD-ROM's requiring pay-per-view play, and those that are free and do not require pay-per-view play. Specifically, when the DVD-ROM to be played is provided with one of the three parental codes, then the software of the invention will treat that DVD-ROM in the conventional manner, by allowing instant playing thereof. Referring to FIG. 1, this is seen by the software determining that a non-pay-per-view DVD-ROM is present, or non-Hyper-DVD disk, and will automatically provide a trigger-signal 24 to a data switch 26. The data switch receiving the trigger-signal, will connect a conventional decryption chip 28 to the DVD-player 12, whereupon the data on the DVD-ROM is decrypted and played back, in the conventional manner.

After the software of the invention has determined that the DVD-ROM 10 is a Hyper-DVD, that is, a pay-per-view DVD, by detection of a code 4 rather than one of the three parental codes, via the header extension or binary code on the DVD-ROM, then the communications-portion 30 of the software of the invention will seek to retrieve the enabling data from a service provider 32' by calling the service-provider over the PSTN. According to the invention, this enabling data may be obtained from the Internet, or, alternatively, via a cable company service provider for those users having cable TV service. In the case of obtaining the enabling data from a cable-TV company, the standard cable-box or set-tip box converter 32 is used for the communications. Also, for those users who utilize a cable box having Internet accessing device, the microprocessor 16 may be that microprocessor of the Internet accessing device itself, with the enabling data being transmitted from the Internet or from the cable TV provider. Instead of using a fourth parental code 4 for indicating the presence of a Hyper-DVD-ROM, a separate and distinct country code may be used, which country code, instead of representing an actual country, represents a Hyper-DVD. The enabling data for allowing access to the DVD-ROM data may be any of those set forth in Applicants' above-mentioned copending patent applications, such as missing header, etc., and may also include conventional password, ID, security methods, or other standard verification keys, which are well-known and conventional.

Figure 3A:
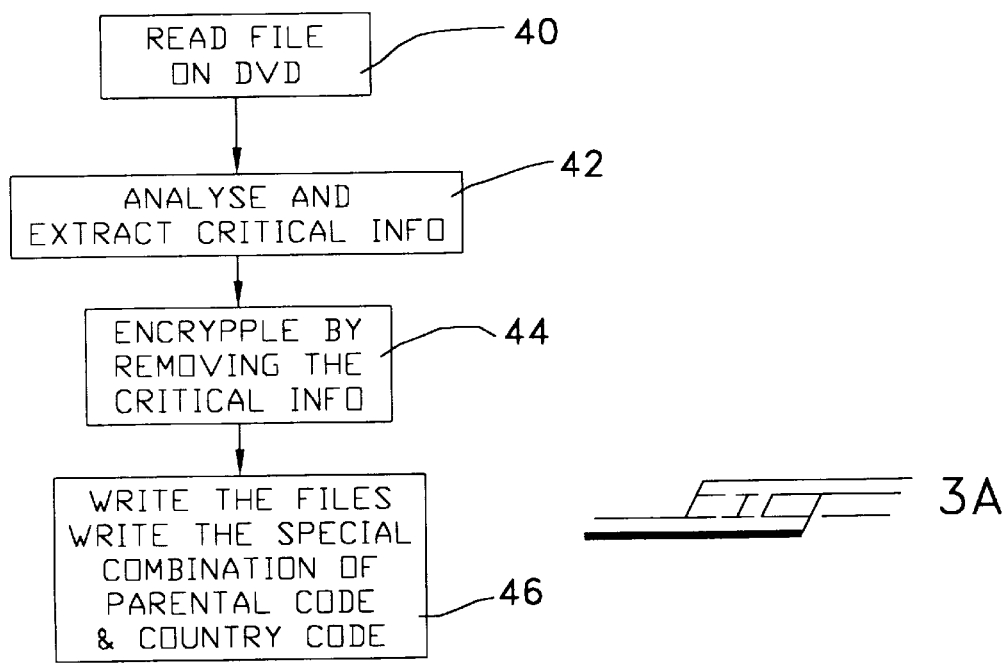
FIGS. 3A 3B and 3C are flow charts for the allowing both pay-per-view DVD-ROM play and conventional, non-pay-per-view DVD-ROM play.

Referring now to FIG. 3A, a flow chart of the software for the encrypting the DVD containing the movie, show, or the like, thereon, is shown. Initially, the Hyper-DVD files are read (block 40), analyzed, and the critical information thereof is extracted (block 42). The critical, or enabling, data for allowing access to the DVD-ROM data may be any of those set forth in Applicants' above-mentioned copending patent applications, such as missing header, etc., and may also include conventional password, ID, security methods, or other standard verification keys, which are well-known and conventional. The DVD-ROM is, therefore, crippled (block 44), and cannot be read without it. The critical or missing data is then stored separately and independently of the DVD-ROM (block 46) for eventual storage by a Internet Service Provider or cable provider, for subsequent downloading to a customer's computer or cable box.

Figure 3B:
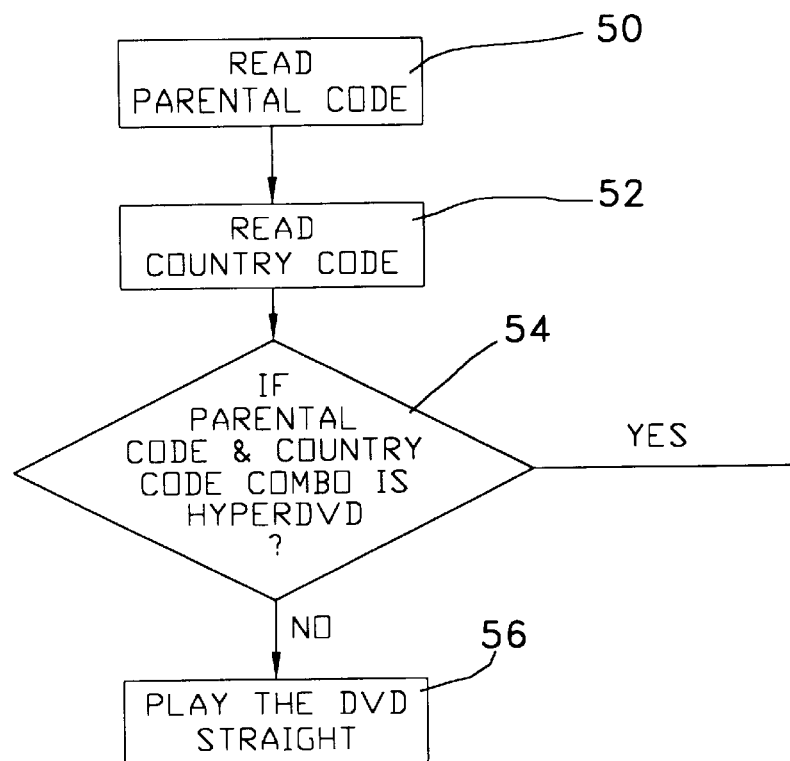

Referring to FIG. 3B, there is shown a flow chart of the software of the invention stored by the Hyper-DVD player. Initially, the software reads the parental code on the DVD-ROM (block 50), and then reads the country code, both of which have been explained hereinabove. After the software of the invention has read the parental and/or country code, the Hyper-DVD-player software determines if the code or codes indicate a Hyper-DVD or a non-Hyper DVD-ROM (decision-block 54). If the codes indicate a non-Hyper-DVD-ROM, but a regular DVD-ROM, then the DVD-player proceeds to the play it (block 56). However, if the code or codes indicate a Hyper-DVD, then the software of the DVD-player communicates with the service-provider (block 60), such as an Internet server or cable-TV provider, and the like. The player-software seeks permission from the service-provider the downloading of the missing, critical data (block 62). After the Hyper-DVD player of the customer's computer or cable box, has received the missing, critical data, the critical data is merged with the crippled, or encrypted, data on the Hyper-DVD-ROM (block 64). Then, the uncrippled software of the Hyper-DVD-ROM is read by the DVD-player for playback (block 66).

Figure 3C:
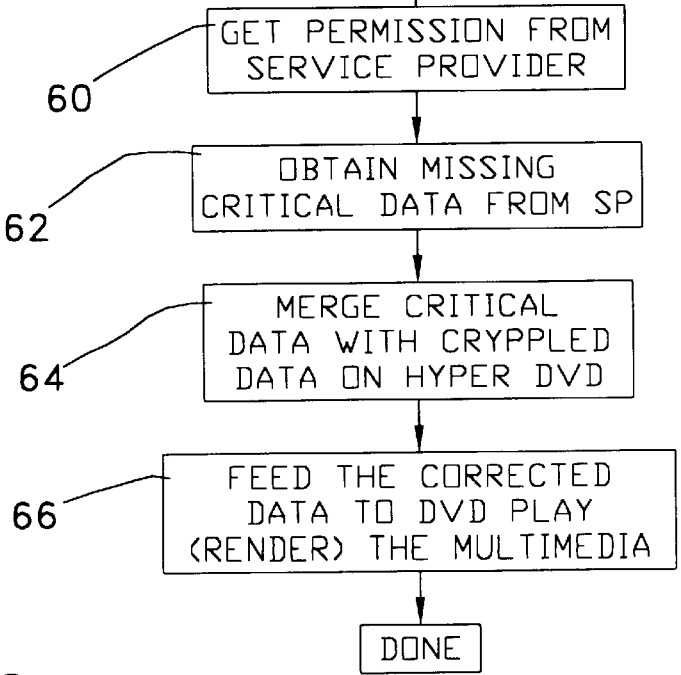
Figure 4:
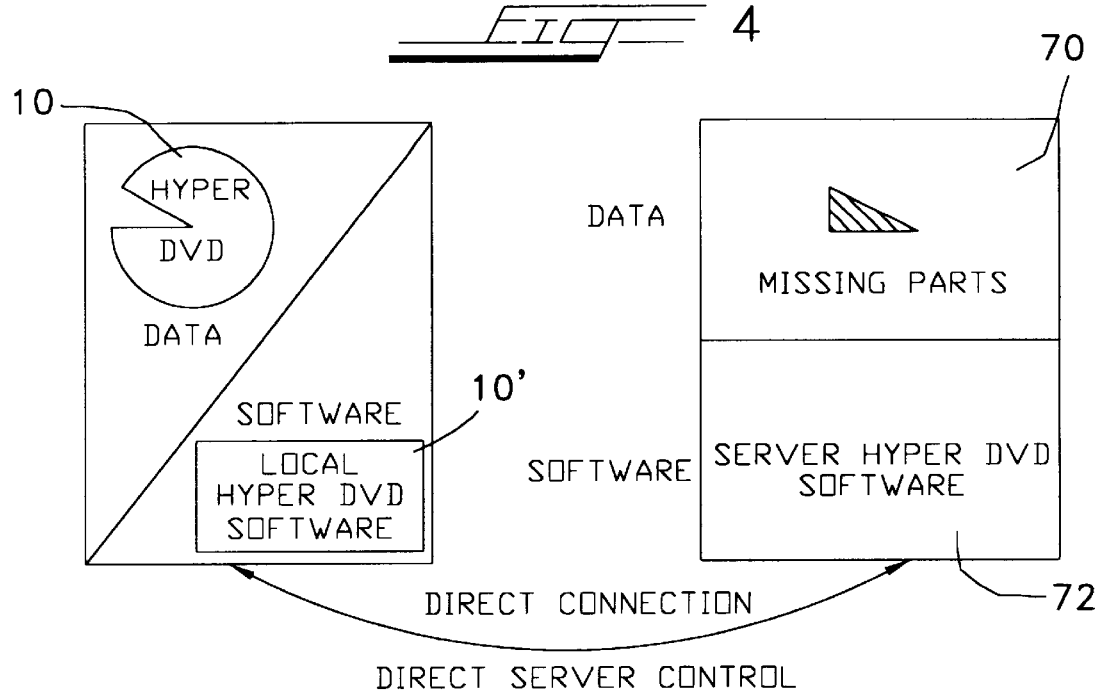
FIG. 4 is a schematic for storing the critical data and software on the server for downloading to a customer.

FIG. 4 is a diagram showing the concept of the invention. At the Hyper-DVD-ROM player at the customer's computer and/or cable box, a crippled Hyper-DVD-ROM 10 that is to be played, and stored there is the software of the invention 10' for determining the type of DVD-ROM and for accessing the service-provider, as explained above in reference FIGS. 3A–3C. If it is a Hyper-DVD-ROM, then the software of the invention communicates with the remote service provider which stores the critical missing data 70 as well as the operating software for the server 72. The service provider may also store and download updating software for the Hyper-DVD players. After the user's software requests the downloading of the enabling data, the service provider will either send the data, if the requester is a valid customer and current on his account, or will reject the request. If the service provider transmits the necessary enabling data, then the software portion of the invention sends the trigger-data 24 to the data switch 26 to connect the decryption chip 28 to the DVD-player 12.

While the invention is preferably suited for DVD-ROM disks, other large-storage disks, such as laser disks, video disks, etc., may embody the invention. Also, the invention may be used for those DVD-ROMs that do not employ parental and/or country codes; in this case, the code on the DVD-ROM for indicating that it is a Hyper-DVD requiring a verification key or password from a service-provider may be any of those set forth in Applicants' copending applications listed above, such as supplying the missing header, or any other data for uncrippling the crippled data on the DVD-ROM. Also, the use of a password or key, and the like, which would be provided by the service-provider if the requester passes a set of requirements, such as credit check, and the like, may be used.

Figure 5:
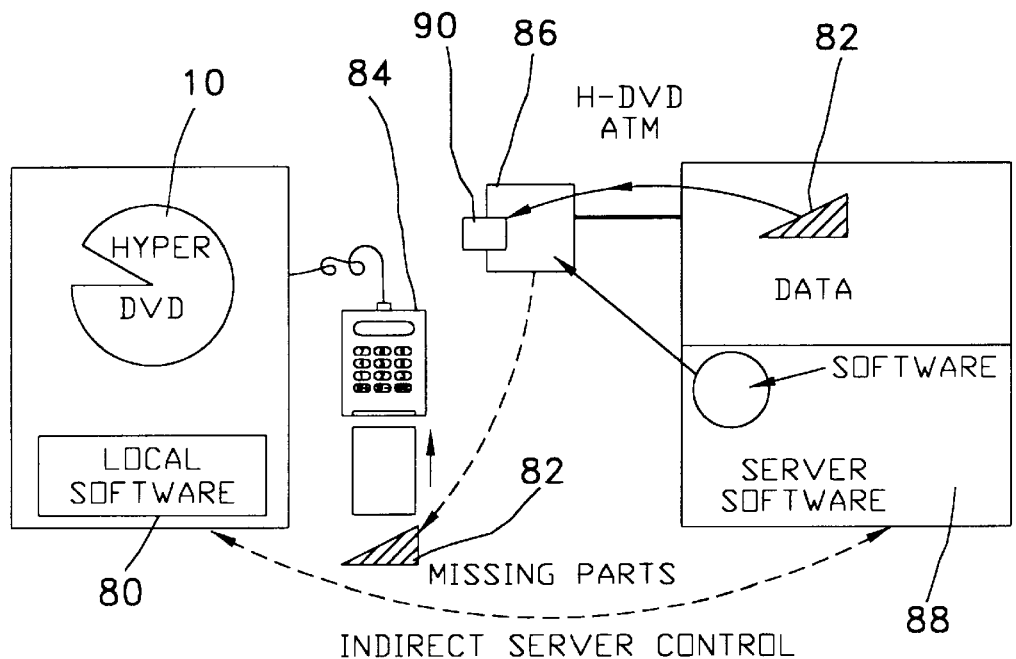
FIG. 5 is a schematic of an alternative embodiment of the invention, in which the critical data is downloaded to an ATM-card, which is ATM card provides the missing, critical data to the customer's computer or cable box.

Referring now to FIGS. 5 and 6, there is shown an alternative embodiment of the invention. In this embodiment, instead of directly accessing the service-provider via the Internet or cable-TV provider for obtaining the missing critical data for uncrippling the Hyper-DVD-ROM, the missing critical data is provided to the customer's computer and/or cable box via the downloading to an Hyper-DVD ATM card at a conventional ATM machine. The ATM card is associated with an account at the service provider for charging the account. The ATM card itself may also have pre-paid data thereon, similar to a telephone calling card, which is debited after every use for uncrippling a Hyper-DVD-ROM. In FIG. 5, the Hyper-DVD 10 associated with the customer's DVD-player is located, along with local software 80 for playing back a DVD-ROM, whether Hyper or not. Of course, if the DVD-ROM 10 is a Hyper-DVD, then playback is impossible without first obtaining the missing critical data 82 on the ATM card. The ATM card is read by a conventional reader 84 for receiving the missing critical data. The ATM card is used with a conventional ATM machine 86 which is operatively connected to the service provider, at which is stored the missing critical data 82, as well as the server software 88.

Referring now to FIG. 6, a Hyper smart card 90 contains software in RAM 92 for communicating with the remote server as well as communicating with the local Hyper-DVD player. In addition, the Hyper-DVD ATM card also has the missing critical data RAM 94 for storing the missing critical data obtained from the service provider via an ATM machine 96. The remote Hyper-DVD server 100 stores the missing critical data 102, accounting and user information 104, and updating software 106, if needed for downloading to the user or customer. Each of the ATM machine 96 and the remote Hyper-DVD server 100 is provided with a conventional security layer 108, 110, respectively, as is well-known The software listing for encrypting the data on the DVD-ROM and for crippling the data files thereon for allowing playback only a DVD player that recognizes the Hyper-DVD nature of the DVD-ROM, the software listing for a DVD player that discriminates between a Hyper-DVD and a standard DVD-ROM, and the software listing for determining if a standard or Hyper DVD-ROM is to be played by the player and for seeking the enabling data, trigger or key from a server or a cable-service provider for providing the missing data necessary for the DVD-player to play a Hyper-DVD, are all listed in the microfiche appendix accompanying and forming a part of this application.

While specific embodiments of the invention have been shown and described, it is to be understood that numerous changes and modifications may be made therein without departing from the scope, spirit and intent of the invention as set forth in the appended claims.

What we claim is:

1. A method of playing back a large storage-capacity ROM-disk, comprising:

(a) reading a ROM-disk via a player apparatus, and differentiating between a ROM-disk encoded to prevent playback thereof without enabling data, and a ROM-disk not encoded to prevent playback without enabling data;

(b) playing the ROM-disk if it is not encoded to prevent playback without enabling data;

(c) generating an enabling-data request to a service-provider to allow playback of the ROM-disk when said ROM-disk is encoded to prevent playback without enabling data;

(d) receiving the enabling data from the service provider; and (e) enabling the playback of the ROM-disk with code to prevent playback by the player apparatus in response to said step (d);

(f) said step (c) comprises inserting at least a smart card or ATM card into a remote-reading apparatus;

(g) said step (d) comprising downloading the enabling data from a service-provider to the card via the remote-reading apparatus.

2. The method of playing back a large storage-capacity ROM-disk according to claim 1, wherein said step (f) comprises instructing the remote-reading apparatus to access the service provider for the downloading of the enabling data.

3. The method of playing back a large storage-capacity ROM-disk according to claim 2, wherein said step of instructing comprises inputting identification means to said remote-reading apparatus for further transmission to the service provider.

4. The method of playing back a large storage-capacity ROM-disk according to claim 3, wherein said step (g) comprises generating account information for end-users that may obtain the enabling data from the service provider; and charging a respective account number associated with the card inserted into the remote-reading apparatus.

5. The method of playing back a large storage-capacity ROM-disk according to claim 4, wherein said step (g) further comprises, before said step of charging, validating the request from a remote-reading apparatus for the enabling data.

6. The method of playing back a large storage-capacity ROM-disk according to claim 1, wherein before said step (a):

(h) encoding a ROM-disk to prevent playback without having first obtained enabling data therefor.

7. The method of playing back a large storage-capacity ROM-disk according to claim 1, wherein said step (a) comprises reading a DVD disk.

8. A ROM-disk playing apparatus for discriminating between a large storage-capacity ROM-disk having playback-prevent code means thereon and a ROM-disk not having playback-prevent code means thereon, comprising:

a disk-player for playing back a ROM-disk;

a microprocessor;

memory means for storing software;

software means comprising first means for detecting the presence of a ROM-disk having playback-prevent code means thereon; second means for retrieving enabling data for allowing playback of data on a ROM-disk; and third means for generating a trigger to allow said disk-player to playback said data on a ROM-disk;

said second means comprising at least a smart card or an ATM card comprising means for storing thereon necessary information for allowing the downloading of the enabling data from a remote site to said at least one of a smart card and ATM card; remote means for reading said at least smart card or ATM card and downloading said enabling data to said at least smart card or ATM card; said at least smart card or ATM card, after having received said enabling data from said remote means, being used to transfer said enabling data to said memory means for allowing said ROM-disk to be played back.

9. The ROM-disk playing apparatus according to claim 8, wherein said memory means further comprises fourth means for decrypting encrypted data on a ROM-disk; said third means invoking said fourth means for decrypting said disk-player.

10. The ROM-disk playing apparatus according to claim 8, wherein said disk-player comprises a MPEG-2 video player.

11. The ROM-disk playing apparatus according to claim 8, in combination with a DVD-ROM disk, said DVD-ROM disk having at least one of a parental code means and a country code means thereon, and playback-prevent code means thereon for preventing playback of said ROM-disk without enabling data.

12. The ROM-disk playing apparatus according to claim 11, wherein said parental code means comprises one of a first code representing children-only titles that may be played by said disk-player, a second code representing that only adult titles are prevented from being played by said disk-player, and a third code representing that all titles may be played by said disk-player, wherein said additional code means for preventing playback of said ROM-disk without enabling data comprises a fourth code of said parental code different from said first, second and third codes.

13. The ROM-disk playing apparatus according to claim 11, wherein said country code means comprises one of a plurality of codes representing a specific country in which said ROM-disk is to be played, said disk-player having a corresponding code matching said one country code allowing playback of said ROM-disk, wherein said additional code means for preventing playback of said ROM-disk without enabling data comprises another unique country code, said another unique country code being one that does not represent an actual country.

14. The ROM-disk playing apparatus according to claim 8, wherein said remote means comprises an ATM apparatus means and computer network means for down-loading to said ATM apparatus said enabling data, after said smart card or ATM card has been read by said ATM apparatus means.

15. The ROM-disk playing apparatus according to claim 14, wherein said means for storing of said smart card or ATM card comprises first means for storing software for communicating with said microprocessor for transferring said enabling data received from said from said card to said ROM-disk playing apparatus.

16. The ROM-disk playing apparatus according to claim 14, wherein said smart card or ATM card comprises second means for storing software for communicating with ATM apparatus means.

* * * * *